United States Patent Office 3,000,743
Patented Sept. 19, 1961

3,000,743
SMOKED HYDROLYZED VEGETABLE PROTEIN MATERIALS
Stanley Tolin, Northbrook, Ill., assignor to Vico Products Company, Chicago, Ill., a corporation of Illinois
No Drawing. Filed Apr. 2, 1959, Ser. No. 803,564
12 Claims. (Cl. 99—140)

My invention relates to the production of new and useful products, in the field of smoked products, comprising hydrolyzed vegetable protein materials impregnated with wood smoke, said products having the capacity of imparting a natural smoke flavor to food products with which they may be admixed.

It has heretofore been known in the art to make smoke-flavored condiments as, for example, smoked salt, smoked yeast, smoked water and smoked brines. Such materials are commonly used to impart smoke flavor to other food products as, for instance, fish, meats, spices and the like. Such smoked condiments have a number of objectionable characteristics. In the first place, in the case of smoked water and smoked brines, the organoleptic properties are poor in that they are characterized by tar-like flavors similar to conventional pyroligneous types of products. Again, the amount of smoke flavor, independently of the objectionable character of such flavor, which is held or absorbed or retained by said smoked water or smoked brines is very small. In the case of smoked products such as smoked yeast, and smoked salt, the amount of smoke flavor which is actually absorbable by the yeast or salt is most distinctly on the low side. For this reason, as well as for others, relatively little use has been made in the art of such heretofore known smoked materials for imparting desired smoke flavor to other food products.

I have made the surprising discovery, as pointed out in detail below, that hydrolyzed vegetable protein materials have the wholly unexpected property, when impregnated with wood smoke, of retaining unusually large quantities of smoke flavoring compounds and, in addition, when such smoked hydrolyzed vegetable protein materials are admixed with other food products to impart a smoke flavor thereto, said smoke flavor is natural and characteristic of freshly generated wood smoke so that the resulting food products actually have what may be characterized as a natural wood smoke flavor. Furthermore, tests have shown that smoked yeast autolysates made in accordance with my invention have the surprising property of exhibiting a definte germicidal effect on *Clostridium sporogenes*.

The hydrolyzed vegetable protein materials which are utilized in accordance with my invention are, per se, known in the art. They may comprise, for instance, yeast autolysates or hydrolysates or plasmolysates, commonly prepared by simply allowing enzymatic action to take place in a debitterized or washed liquid waste brewer's yeast. One illustrative procedure consists simply in screening fresh liquid waste brewer's yeast through a 100 mesh vibrating screen to remove hop resins and other debris, heating the screened yeast to 44 degrees C., storing for 10 hours to effect autolysis, and then passing the resulting autolyzed yeast through yeast separators to remove residual undissolved yeast matter.

The hydrolyzed vegetable protein material may also comprise acid- or alkali-hydrolysis products of wheat flour, soya bean flour, and other cereal flours. In the usual preparation of such hydrolysates, for instance, by acid treatment of the vegetable protein material, after the hydrolysis has been completed, the excess acid is neutralized to a pH of approximately 7.

In the practice of my invention, the smoke may be generated from any suitable wood and, in the usual case, hickory wood is utilized. The smoke may be generated through the employment of any desired smoke generating equipment and the smoke, as generated, is passed into intimate contact with the liquid hydrolyzed vegetable protein material. It is desirable, in carrying out the impregnation of the liquid hydrolyzed vegetable protein material, to agitate the same and continuously to circulate it so as to absorb a maximum amount of the smoke.

The following Table I shows the composition of three typical liquid vegetable protein hydrolysates utilized in accordance with my invention for the absorption thereinto of wood smoke.

Table I

| | Autolyzed Yeast Extract | Soybean Hydrolysate | Wheat Hydrolysate |
|---|---|---|---|
| Total Solids_____percent__ | 40.3 | 32.2 | 43.7 |
| Total Nitrogen_____do____ | 3.30 | 0.85 | 4.06 |
| Protein (N×6.25)_____do____ | 20.6 | 5.3 | 25.4 |
| Sodium Chloride_____do____ | 10.0 | 15.0 | 13.7 |
| pH: | | | |
| before smoking_____ | 5.2 | 5.0 | 5.2 |
| after smoking_____ | 4.8 | 4.5 | 4.6 |

As illustrative of the practice of my invention, the foregoing three typical liquid vegetable protein hydrolysates were smoked in the following manner. The smoke was generated by burning damp hickory sawdust at a temperature slightly below 150 degrees F. The liquid vegetable protein hydrolysates were passed downwardly through an absorption column 36 inches high and 27 inches in diameter packed with 3/4 inch ceramic Raschig rings supported on wire mesh screens above the smoke inlet, the latter being tangentially arranged at the bottom of the column. The smoke, generated at a rate of approximately 400 c.f.m., was passed upwardly from the bottom of said absorption column through the downwardly descending liquid vegetable protein hydrolysate. When the said hydrolysate reached the bottom of the absorption column, it was recirculated by again being pumped to the top of the absorption column and allowed to pass downwardly therethrough. This recirculation was continued for approximately 24 hours based upon a 40 gallon total volume of liquid.

The smoked samples were then assayed for smoke content in accordance with known procedures. The particular procedure utilized in the instant case involved taking a 100 ml. sample of the smoked liquid vegetable hydrolysate, distilling the same until 10 ml. of distillate was collected, then adding said distillate to an Erlenmeyer flask containing 20 ml. of $KMnO_4$ (0.1 N) and 10 ml. of 2 N sulfuric acid. From 20 to 30 ml. of distilled water was used to wash the sample of distillate into the mixture in the Erlenmeyer flask. The final mixture was then shaken continuously for exactly 10 minutes, counting time from the addition of the distillate to the mixture. At the end of 10 minutes, 2 g. of KI, which had previously been dissolved in 10 ml. of distilled water, was added to the mixture and then said mixture was immediately titrated with 0.1 N sodium thiosulfate using 2 ml. of a 1% soluble starch indicator added just before the finish of the titration. The end point is clear and colorless. The results of these tests are set forth below in Table II.

Table II

| Sample | Titration Smoked | ml., Non-Smoked | Net $KMnO_4$ Value |
|---|---|---|---|
| Yeast Autolysate_____ | 179 | 19 | 160 |
| Wheat Hydrolysate_____ | 198 | 44 | 154 |
| Soybean Hydrolysate_____ | 216 | 8 | 208 |
| Water_____ | 100 | 0 | 100 |

It will be seen, in the light of the foregoing, that the level of takeup or pickup or absorption of the smoke flavor by the yeast autolysate, the wheat hydrolysate and the soya bean hydrolysate was greatly in excess of the pickup of the smoke flavor by the water.

Other tests have shown, in the case of smoked yeast, as prepared in accordance with previously known procedures, that the smoke pickup by the yeast is only of the order of about one-quarter or even less than that obtained in the case of the vegetable protein hydrolysates.

Organoleptic tests were also carried out on the basis of which the character of the smoke flavor was evaluated. To this end, a gravy base composed of 115 g. of flour, 8 g. of salt, and 2070 ml. of water was used organoleptically to test the smoke flavor. One-half gram of each sample was added to 50 ml. of said gravy base and then tasted. The solution was then diluted with additional gravy base until the smoke flavor no longer could be detected by taste. The results of such tests are shown in Table III.

Table III

| Sample: | Total ml. gravy added to ½ gram of sample |
|---|---|
| Yeast autolysate | 475 |
| Wheat hydrolysate | 450 |
| Soybean hydrolysate | 750 |
| Water [1] | |

[1] Smoked water could not be tasted as a "Smoke" flavor. Flavor was very poor and characterized as "Tar-Like." The 1% dilution tasted particularly of pyroligneous type products.

While, in the usual case, the smoked hydrolyzed vegetable protein materials of my present invention will be used in liquid form, it will be understood that the same may be converted into pastes by evaporation of water therefrom or, alternatively, the products can be dried, for instance, spray dried, and still retain their smoke flavor and their ability to impart such smoke flavor to food products with which they are admixed. In those instances in which the smoked hydrolyzed vegetable protein materials of my invention are marketed in the form of liquids containing up to 60 or 70% of solids, it is desirable that the same contain several percent of salt, for example, from about 5 to about 18%, preferably 8 to 15%, of salt. In those cases where the smoked hydrolyzed vegetable protein materials are marketed in the form of heavy pastes, for instance, containing upwards of 90% of solids, or in dried form as, for example, in the form of spray dried products, the salt content thereof may be substantially reduced or entirely omitted. In general, it is particularly preferred that the liquid smoked hydrolyzed vegetable protein materials have a pH in the range of about 4.5 to 5.

The products of my invention have a wide utility for the flavoring of various food products. Thus, for instance, they can be employed for the flavoring of canned fish by adding small proportions of the smoked liquid hydrolyzed vegetable protein to the cans together with the fish, closing the cans and then processing at elevated temperatures in accordance with known practices. They are also highly useful as seasoning bases for spices. Other uses will be apparent in the light of their properties and characteristics which have been described above.

The term "hydrolyzed vegetable protein material," as used above and in the claims, is intended to encompass vegetable protein hydrolysates, autolysates and plasmolysates, and, in general, vegetable protein materials at least the protein constituents of which are modified by hydrolytic procedures whether the same are effected through the media of acids, alkalies or enzymes.

What I claim as new and desire to protect by Letters Patent of the United States is:

1. A new and useful product comprising a hydrolyzed vegetable protein material impregnated with wood smoke, said product having the capacity of imparting a natural smoke flavor to food products with which it may be admixed.

2. A new and useful product comprising a liquid hydrolyzed vegetable protein material impregnated with wood smoke, said product having a pH in the range of about 4.5 to 5, and having the capacity of imparting a natural smoke flavor to food products with which it may be admixed.

3. A new and useful product comprising a liquid hydrolyzed vegetable protein material containing from about 5 to about 18% of salt, said product being impregnated with wood smoke and having a pH in the range of about 4.5 to 5, and having the capacity of imparting a natural smoke flavor to food products with which it may be admixed.

4. A new and useful product comprising autolyzed yeast impregnated with wood smoke, said product having the capacity of imparting a natural smoke flavor to food products with which it may be admixed.

5. A new and useful product comprising a liquid autolyzed yeast impregnated with wood smoke, said product having a pH in the range of about 4.5 to 5, and having the capacity of imparting a natural smoke flavor to food products with which it may be admixed.

6. A new and useful product comprising a liquid autolyzed yeast containing from about 5 to about 18% of salt, said product being impregnated with wood smoke and having a pH in the range of about 4.5 to 5, and having the capacity of imparting a natural smoke flavor to food products with which it may be admixed.

7. A new and useful product comprising soya bean hydrolysate impregnated with wood smoke, said product having the capacity of imparting a natural smoke flavor to food products with which it may be admixed.

8. A new and useful product comprising a liquid soya bean hydrolysate impregnated with wood smoke, said product having a pH in the range of about 4.5 to 5, and having the capacity of imparting a natural smoke flavor to food products with which it may be admixed.

9. A new and useful product comprising a liquid soya bean hydrolysate containing from about 5 to about 18% of salt, said product being impregnated with wood smoke and having a pH in the range of about 4.5 to 5, and having the capacity of imparting a natural smoke flavor to food products with which it may be admixed.

10. A new and useful product comprising wheat flour hydrolysate impregnated with wood smoke, said product having the capacity of imparting a natural smoke flavor to food products with which it may be admixed.

11. A new and useful product comprising a liquid wheat flour hydrolysate impregnated with wood smoke, said product having a pH in the range of about 4.5 to 5, and having the capacity of imparting a natural smoke flavor to food products with which it may be admixed.

12. A new and useful product comprising a liquid wheat flour hydrolysate containing from about 5 to about 18% of salt, said product being impregnated with wood smoke and having a pH in the range of about 4.5 to 5, and having the capacity of imparting a natural smoke flavor to food products with which it may be admixed.

References Cited in the file of this patent

UNITED STATES PATENTS

| 2,217,264 | Weizmann | Oct. 8, 1940 |
| 2,677,614 | Freshel | May 4, 1954 |